United States Patent
Gu et al.

(10) Patent No.: US 10,110,893 B2
(45) Date of Patent: Oct. 23, 2018

(54) METHOD AND DEVICE FOR CALCULATING DISTORTION OF A VIDEO BEING AFFECTED BY COMPRESSION ARTIFACTS AND CHANNEL ARTIFACTS

(75) Inventors: Xiao Dong Gu, Beijing (CN); Fan Zhang, Hubei (CN); Zhibo Chen, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 501 days.

(21) Appl. No.: 14/343,047

(22) PCT Filed: Sep. 9, 2011

(86) PCT No.: PCT/CN2011/079515
§ 371 (c)(1),
(2), (4) Date: Mar. 5, 2014

(87) PCT Pub. No.: WO2013/033913
PCT Pub. Date: Mar. 14, 2013

(65) Prior Publication Data
US 2014/0219364 A1    Aug. 7, 2014

(51) Int. Cl.
*H04N 19/00*    (2014.01)
*H04N 19/86*    (2014.01)
*H04N 19/154*    (2014.01)

(52) U.S. Cl.
CPC ..... *H04N 19/00909* (2013.01); *H04N 19/154* (2014.11)

(58) Field of Classification Search
CPC .............................................. H04N 19/00909
See application file for complete search history.

(56) References Cited

U.S. PATENT DOCUMENTS

| 7,639,739 B2 | 12/2009 | Rose et al. |
| 2008/0037864 A1 | 2/2008 | Zhang et al. |

(Continued)

FOREIGN PATENT DOCUMENTS

| CN | 101198058 | 6/2008 |
| CN | 101287129 | 10/2008 |

(Continued)

OTHER PUBLICATIONS

Winkler et al., "The Evolution of Video Quality Measurement: From PSNR to Hyprid Metrics", IEEE Transactions Broadcasting, vol. 54, No. 3, Sep. 1, 2008, pp. 660-668.

(Continued)

*Primary Examiner* — Mehrdad Dastouri
*Assistant Examiner* — Rowina Cattungal
(74) *Attorney, Agent, or Firm* — Tutunjian & Bitetto, P.C.

(57) ABSTRACT

In video quality control and estimation, the joint evaluation of compression artifacts and channel artifacts is a problem. The invention considers the joint perception of both a compression artifact level $D_m(V)$ and a channel artifact level $D_h(V)$ in a method for calculating overall distortion in a video being affected by compression artifacts and channel artifacts. The method comprises a step of adding a compression artifact level $D_m(V)$ and a summand S that is derived from $\log(D_h(V))$ multiplied with a factor that decreases with increasing compression artifact level $D_m$, such as $D(V) = D_m(V) + c \cdot (K - D_m(V)) \cdot \log(D_h(V))$. The result obtained is a measure for the overall distortion.

17 Claims, 3 Drawing Sheets a)

b)

(56) References Cited

U.S. PATENT DOCUMENTS

| | | | |
|---|---|---|---|
| 2009/0080798 A1 | 3/2009 | Maurer et al. | |
| 2009/0158358 A1* | 6/2009 | Yu | H04N 21/44227 |
| | | | 725/62 |
| 2009/0268823 A1 | 10/2009 | Dane et al. | |
| 2009/0309977 A1 | 12/2009 | Gevrecki et al. | |
| 2012/0069927 A1* | 3/2012 | Oyman | H04L 1/0019 |
| | | | 375/285 |

FOREIGN PATENT DOCUMENTS

| | | |
|---|---|---|
| CN | 101510298 | 8/2009 |
| CN | 101729874 | 6/2010 |
| CN | 101874409 | 10/2010 |
| CN | 102075784 | 5/2011 |
| JP | 2011519228 | 6/2011 |
| WO | WO2007130389 | 11/2007 |
| WO | WO2012151719 | 11/2012 |

OTHER PUBLICATIONS

Yang et al., "No reference quality assessment for networked Video via primary analysis of bit stream", IEEE Transactions on circuits and systems for video technology, vol. 20, No. 11, Nov. 1, 2010, pp. 1544-1554.

Wang et al., "Network-Based Model for Video Packet Importance Considering Both Compression Artifacts and Packet Losses", IEEE Communications Society subject matter experts for publication in the IEEE Globecom 2010 proceedings.

Wang et al., "Packet Dropping for H.264 Videos Considering both Coding and packet-Loss artifacts", 18th International Packet Video Workshop (PV 2010), Dec. 13-14, 2010.

Kornhonen, J. Audiovisual Quality Assesment in Communications Applications: Current Status, Trends And Challenges, International Symposium on Intelligent Signal Processing and Communications Systems (ISPACS 2010), Dec. 6-8, 2010.

Liu etal: "A Novel Video Quality metric for Low Bit-rate Video Considering both Coding and Packet-loss Artifacts",IEEE Journal of Selected Topics in Signal Processing,vol. 3, No. 2, pp. 280-293, Apr. 2009.

Wang etal: "A Universal Image Quality Index", IEEE Signal Processing Letters, vol. 9, No. 3, p. 81-84, Mar. 2002.

Search Report dated Jun. 14, 2012.

* cited by examiner

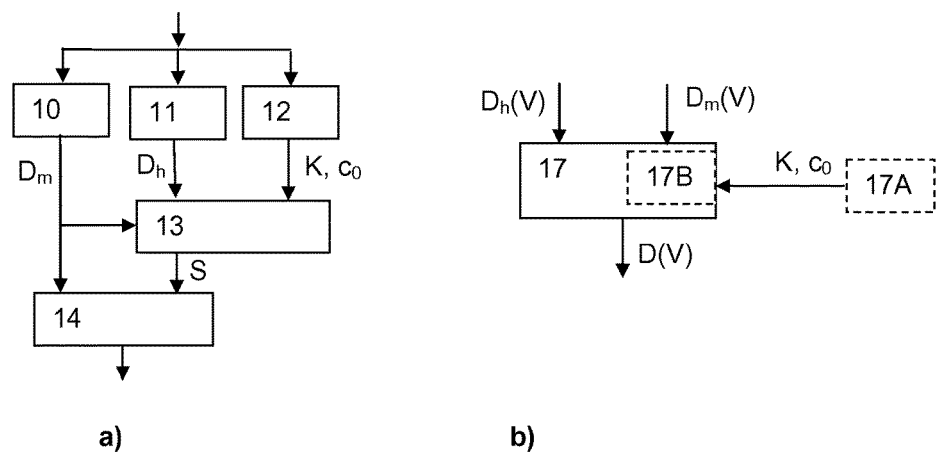
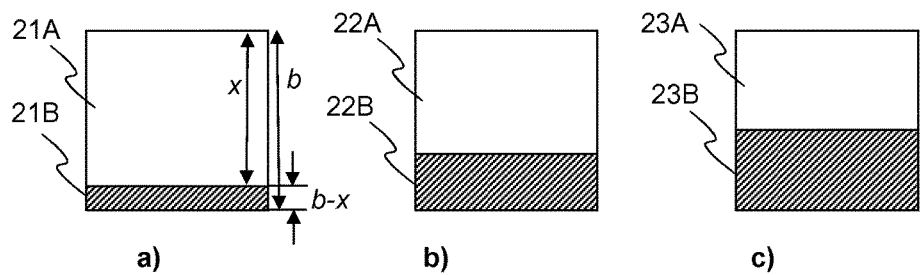
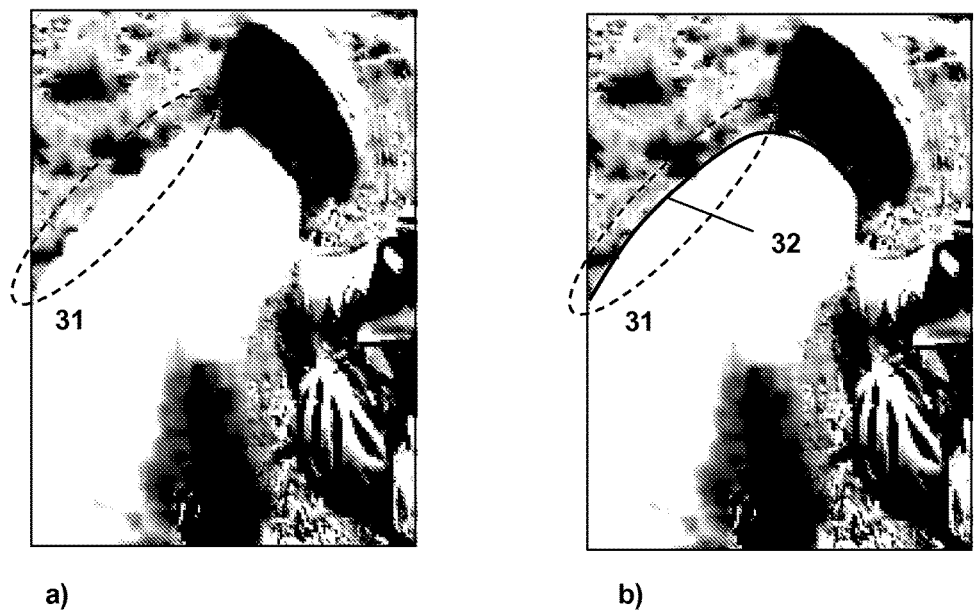
Fig.3

METHOD AND DEVICE FOR CALCULATING DISTORTION OF A VIDEO BEING AFFECTED BY COMPRESSION ARTIFACTS AND CHANNEL ARTIFACTS

This application claims the benefit, under 35 U.S.C. § 365 of International Application PCT/CN2011/079515, filed Sep. 9, 2011, which was published in accordance with PCT Article 21(2) on Mar. 14, 2013 in English.

FIELD OF THE INVENTION

This invention relates to a method for calculating overall distortion of a video being affected by compression artifacts and channel artifacts. The invention also relates to a corresponding device. Further, the invention relates to a method for assigning in a bandwidth limited transmission system available bandwidth to a video stream and to a packet loss recovery stream, and a corresponding device.

BACKGROUND

A compression artifact is a particular type of data error that is typically the result of quantization in lossy data compression. Traditional compression artifacts include blockiness, blur, noise, and ring. Automatic measuring of compression artifacts is described e.g. in "A Universal Image Quality Index" by Z. Wang, and A. C. Bovik, IEEE Signal Processing Letters, vol. 9, p. 81-84, March 2002, which describes a simple Structure Similarity (SSIM) indexing algorithm.

A channel artifact is the data error subject to data loss, which in most networks corresponds to packet loss. A single packet loss affects an initial set of macro-blocks (MBs). The artifacts of each single packet loss can propagate to the previous and/or the following frames as a result of interframe prediction of the video codec. Channel artifacts can be automatically measured as described in a co-pending patent application [2], which describes a method for estimating on bit-stream level, before error concealment, a video quality that will be obtained after the error concealment.

The perception of streamed video over lossy network is influenced by both compression artifacts and channel artifacts. ITU-T SG12/Q14P.NBAMS deals with methods for evaluating viewer perception when there are both compression artifacts and channel artifacts in video sequences.

Normally, the evaluation results are expressed as an evaluation score, which are mapped, both for compression artifacts or channel artifacts, to a score between 1 and 5 according to the definition of Mean Opinion Score (MOS). The score levels are described in Tab.1.

TABLE 1

Mean Opinion Score (MOS)

| MOS | Description |
| --- | --- |
| 1 | No artifacts perceived |
| 2 | Recognized artifacts, but totally not influence perception |
| 3 | Perceived artifacts, but not annoying |
| 4 | Clear artifacts, a little annoying |
| 5 | Heavy artifacts, very annoying |

Though several researchers addressed the evaluation problem of compression artifacts or channel artifacts respectively, few studies focus on the joint perception considering both compression artifacts and channel artifacts. A traditional solution is to evaluate the overall distortion by averaging compression artifacts and channel artifacts. E.g. T. Liu, Y. Wang, J. Boyce, H. Yang, and Z. Wu in "A Novel Video Quality metric for Low Bit-rate Video Considering both Coding and Packet-loss Artifacts", Special Issue on Visual Media Quality Assessment, IEEE Journal of Selected Topics in Signal Processing, Vol. 3, No. 2, pp. 280-293, April 2009, generate the overall artifacts by a linear combination of compression artifacts and channel artifacts. The term "artifact level" is to be understood such that higher artifact level corresponds to more distortion, and vice versa. Thus, low distortion and low artifact levels are generally desired.

For accurate video quality estimation, and for a video quality control based on such estimation, both the existing average and linear combination models are not efficient enough. For example, channel artifacts seem more annoying in a video with very low compression artifacts, while it is much more acceptable in a video with high compression artifacts. This phenomenon cannot be predicted by average and linear combination models.

SUMMARY OF THE INVENTION

An objective of the present invention is to provide overall distortion prediction for a video sequence when both compression artifacts and channel artifacts are present in the video sequence. For solving this problem, a non-linear combination model for evaluating the overall distortion considering both compression artifacts and channel artifacts is disclosed.

In one aspect according to the present invention, a method for calculating overall distortion in a video being affected by compression artifacts and channel artifacts comprises adding a compression artifact level $D_m(V)$ and a summand S that is derived from $\log(D_h(V))$ multiplied with a factor that decreases with increasing compression artifact level $D_m$. The result obtained is a measure for the overall distortion. Both the compression artifact level $D_m(V)$ and the channel artifact level $D_h(V)$ are positive by definition. An example is $$D(V)=D_m(V)+c_0(K-D_m(V))\cdot\log(D_h(V)) \qquad (1)$$

where $D(V)$ is the overall distortion level of a video sequence V, $c_0$ is a constant multiplication factor, K is a constant summand and log is a logarithm on any basis, usually ten (i.e. $\log_{10}$). It may however be a different basis. In general, the above-mentioned summand S corresponds to $$S=c_0(K-D_m(V))\cdot\log(D_h(V)) \qquad (2)$$

Due to the factor $(K-D_m(V))$, which must be non-negative, the non-negative summand S decreases with increasing compression artifact level $D_m(V)$. The resulting distortion level $D(V)$ is an improved measure for the overall distortion of the video sequence V, resulting from compression artifacts and channel artifacts.

Various embodiments can be created by selecting a particular constant positive multiplication factor $c_0$, a particular constant positive summand K and/or a basis for the logarithm. Further, any range can be used for the compression artifact level $D_m(V)$ and the channel artifact level $D_h(V)$, provided that both use the same range. In an embodiment, the used artifact level ranges are mapped to the MOS range of 1 ... 5 before applying the above eq.(1).

A corresponding apparatus for calculating overall distortion in a video being affected by compression artifacts and channel artifacts comprises adding means for adding a compression artifact level $D_m(V)$ and a summand S, where the summand S is derived from log ($D_h(V)$) multiplied with a factor that decreases with increasing compression artifact level $D_m(V)$.

Both channel artifact level $D_h(V)$ and compression artifact level $D_m(V)$ are in principle dependent from available bandwidth. Therefore, the invention can be used for optimizing bandwidth usage in a bandwidth limited transmission system. Advantageously, this results in a method for assigning in a bandwidth limited transmission system available bandwidth to a video stream and to a packet loss recovery stream. A higher bandwidth in the video stream results in less compression artifacts, while a higher bandwidth in the packet loss recovery stream results in less channel artifacts. Optimized bandwidth usage is achieved with an optimized overall distortion level as described above, e.g. according to eq.(1).

Thus, another aspect according to the present invention is a method for assigning in a bandwidth limited transmission system available bandwidth b to a video stream and to a packet loss recovery stream, wherein the bandwidth x assigned to the video stream leads to a compression artifact level of $D_m(x)$ and the bandwidth assigned to the packet loss recovery stream leads to channel artifacts level of $D_h(b-x)$, with steps of minimizing the overall distortion according to eq.(1) and determining the corresponding bandwidth x. In other words, the bandwidth x is selected such that the overall distortion according to $D(D_m(x), D_h(b-x))$ is minimized. The overall distortion is calculated according to the method for calculating overall distortion in a video being affected by compression artifacts and channel artifacts, as described above.

An apparatus that utilizes the method is disclosed in claim 13.

In one aspect, the invention is a computer readable medium having executable instructions to cause a computer to perform a method for calculating overall distortion in a video being affected by compression artifacts and channel artifacts, comprising a step of adding a compression artifact level $D_m(V)$ and a summand S that is derived from log ($D_h(V)$) multiplied with a factor that decreases with increasing compression artifact level $D_m(V)$.

According to a particular embodiment of the invention, a model for an estimation of overall distortion considering both compression artifacts and channel artifacts works according to $$D(V)=f(D_m(V), D_h(V))=D_m(V)+c_0(K-D_m(V))\log(D_h(V)) \quad (3)$$

where K and $c_0$ are constants. $c_0$ is set to $c_0=0.9/\log(K)$, and K is set the maximum score value (i.e., best quality). Thus, in one embodiment particularly for MOS in the range 1 . . . 5, K is set to K=5 and $c_0$ is set to $c_0=0.9/\log(5)=1.2867$ . . .

Further advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1a) a flow-chart of a method for calculating overall distortion;

FIG. 1b) the structure of a device for calculating overall distortion;

FIG. 2 different configurations of bandwidth assigned to a video stream and to a packet loss recovery stream in a bandwidth limited transmission system;

FIG. 3 exemplary compression artifacts;

DETAILED DESCRIPTION OF THE INVENTION

Figure 4:
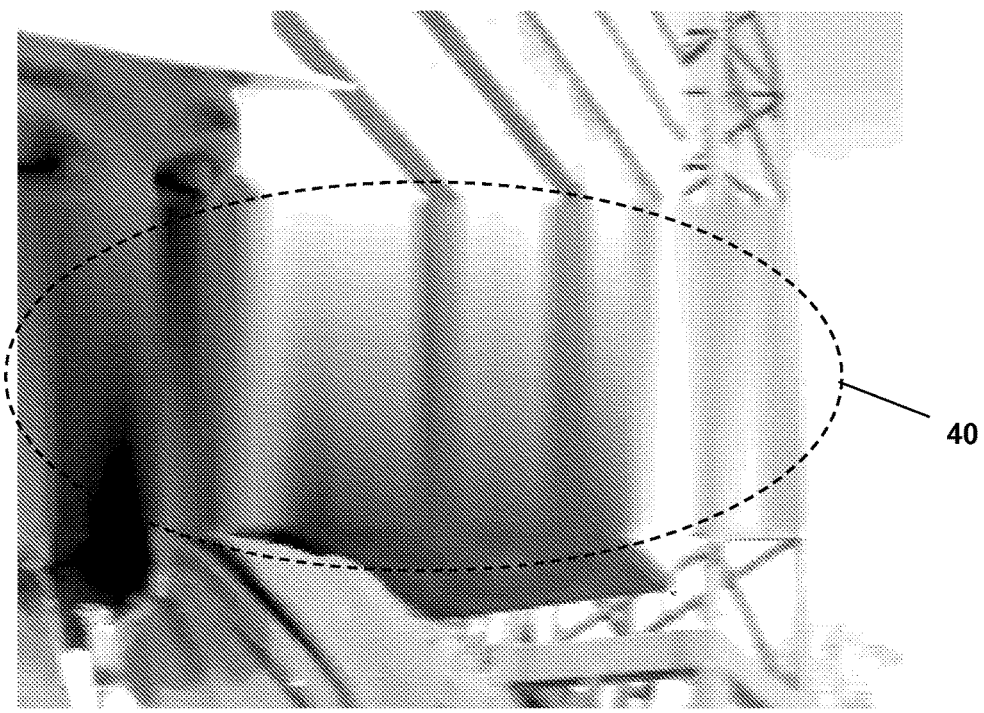
FIG. 4 exemplary channel artifacts due to packet loss, after error concealment.

For simplicity, $D_m$ will be written instead of $D_m(V)$ and $D_h$ will be written instead of $D_h(V)$ in the following.

FIG. 1a) shows a flow-chart of an exemplary method for determining, by calculation, an overall distortion of a video being affected by compression artifacts and channel artifacts, according to one aspect of the invention. The method comprises a step of adding 14 a compression artifact level $D_m$ and a summand S that is derived 13 from a logarithm of a channel artifacts level, i.e. $\log_{10}(D_h)$, multiplied with a factor that decreases with increasing compression artifact level $D_m$ to obtain a measure for said distortion. $D_h$ is the channel artifacts level. The method may additionally comprise one or more of the steps of determining 10 a compression artifacts level $D_m$, determining 11 a channel artifacts level $D_h$ and determining 12 parameter values K, $c_0$ for calculating 14 the overall distortion. The parameter value determining step 12 may be implicit, e.g. if the parameters are fixed.

The compression artifact determining step 10 may comprise performing automatic measuring of a compression artifact level, as described above. In another embodiment, the compression artifact determining step 10 retrieves a stored or externally provided compression artifact level. Likewise, the channel artifact determining step 11 may comprise performing automatic measuring of a channel artifact level, as described above. In another embodiment, the channel artifact determining step 11 retrieves a stored or externally provided channel artifact level. The compression artifact determining step 10, the channel artifact determining step 11 and the parameter value determining step 12 may be performed simultaneously or sequentially.

As described above, the deriving step 13 performs at least a calculation of the summand S that is derived from log ($D_h$) multiplied with a factor that decreases with increasing compression artifact level $D_m$ according to eq.(2). In one embodiment, the calculation of log($D_h$) is performed in the deriving step 13, but in another embodiment it may already be performed in the determining step 11, so that the channel artifact determining step 11 determines log($D_h$) directly instead of $D_h$. In one embodiment, the calculation of log($D_h$) is performed by an approximation. The basis of the logarithm may be fixed, e.g. $\log_{10}$ or Ln (i.e., $\log_e$).

The adding step 14 adds the derived compression artifact level $D_m$ to the summand S to obtain a measure D for the overall artifacts level (i.e. overall distortion).

FIG. 1b) shows a corresponding apparatus for calculating overall distortion in a video being affected by compression artifacts and channel artifacts. It comprises at least adding means 17 for adding a compression artifact level $D_m(V)$ and a summand S that is derived from $\log(D_h(V))$ multiplied with a factor that decreases with increasing compression artifact level $D_m(V)$. Generally, the apparatus may get the parameters K, $c_0$ as an explicit or implicit input. In one embodiment, the apparatus further comprises input means 17A for receiving control data from a user interface, and control means 17B for setting or adjusting at least one of the parameters K and $c_0$ according to the control data.

Since the invention is related to both compression artifacts and channel artifacts, and the perception of streamed video (e.g. over a lossy network) is influenced by both types of artifacts, these artifacts are explained in the following.

A compression artifact is a particular type of data error that is typically the result of quantization in lossy data compression. Traditional compression artifacts include blockiness, blur, noise, and ring, etc. An example is shown in FIG. 3, which shows a person with a bent back. Compression artifacts appear e.g. in the area 31 of the person's back. Without compression artifacts, the back should appear as a steady line 32. However, at least quantization errors, blockiness and noise destroy the linear appearance of the back. Similar artifacts appear on many structures in the image that are not exactly horizontal or vertical.

A channel artifact results from a fault that occurs during transmission. An example is a data error subject to packet loss, which may happen at least in packet-oriented networks. A single packet loss affects an initial set of macroblocks (MBs).

The artifacts occur not only in the actual frame or image, but they can propagate to previous and/or following frames or images as a result of inter-frame prediction of the video codec. Some examples of channel artifacts are shown in FIG. 4 and FIG. 5.

Figure 5:
FIG. 5 exemplary channel artifacts due to error propagation after packet loss.

FIG. 4 shows exemplary channel artifacts due to packet loss, and particularly effects after error concealment. If image data in an area 40 of the image are lost, error concealment can replace them with similar data, e.g. from a previous image, which may also be interpolated. This results in a great loss of details, and a smearing effect in the concealed area 40. FIG. 5 shows a predicted frame, where the prediction is based upon a distorted or error concealed frame. Therefore, the prediction for some areas—usually several macroblocks—has no reference data available or uses wrong reference data, and misplaced blocks 50 occur. This may occur particularly in areas of high motion.

As described in [2], channel artifacts can be automatically measured by extracting or calculating a plurality of global condition features from a video bit-stream, extracting or calculating a plurality of local effectiveness features at least for a lost MB, calculating a numeric error concealment effectiveness level for each (or at least for each lost) MB, and providing the calculated error concealment effectiveness level as an estimated visible artifacts level of video quality. The calculation of a numeric error concealment effectiveness level can be achieved by emulating an error concealment method that is used in the error concealment. The plurality of effectiveness features are e.g. from the group of spatial motion homogeneity, temporal motion consistence, texture smoothness, and the probabilities of one or more special encoding modes. The plurality of condition features are global features of each frame, as calculated from the received bitstream. They serve as a condition to determine or estimate which type of EC method is used for a frame after transmission losses. Exemplary condition features are frame type, ratio of intra-MB/inter-MB (i.e., num_intra_MBs/num_inter_MBs), motion index and texture index. All the used features are based on data that are extracted from the coded video at bitstream-level, i.e. without decoding the bitstream to the pixel domain.

The automatic measuring of compression artifacts as described in "A Universal Image Quality Index" comprises measuring loss of correlation, luminance distortion and contrast distortion, and combining the three measures. The quality index Q is in that document obtained according to the following definition:

$$Q = \frac{\sigma_{xy}}{\sigma_x \sigma_y} \cdot \frac{2\bar{x}\bar{y}}{(\bar{x})^2 + (\bar{y})^2} \cdot \frac{2\sigma_x \sigma_y}{\sigma_x^2 + \sigma_y^2} \qquad (4)$$

within a dynamic range of [−1,1] and with $$\bar{x} = \frac{1}{N}\sum_{i=1}^{N} x_i \text{ and } \bar{y} = \frac{1}{N}\sum_{i=1}^{N} y_i, \qquad (4a), (4b)$$

$$\sigma_x^2 = \frac{1}{N-1}\sum_{i=1}^{N}(x_i - \bar{x})^2 \text{ and } \sigma_y^2 = \frac{1}{N-1}\sum_{i=1}^{N}(y_i - \bar{y})^2 \qquad (4c), (4d)$$

$$\text{and } \sigma_{xy} = \frac{1}{N-1}\sum_{i=1}^{N}(x_i - \bar{x})(y_i - \bar{y}) \qquad (4e)$$

where $x = \{x_i | i = 1, 2, \ldots, N\}$ and $y = \{y_i | i = 1, 2, \ldots, N\}$ are the original and distorted image signals, respectively. In eq.(4), the first factor corresponds to loss of correlation, the second factor to luminance distortion and the third factor to contrast distortion. Also other kinds of automatic measuring of compression artifacts may be used. In any case, the result is normalized to a required range, e.g. the MOS range of 1, . . . , 5, by linear mapping, linear scaling and/or adding or subtracting a constant if required. E.g. an artifact level in the range 0, . . . , 1 can simply be multiplied by four in a linear scaling, and then shifted from [0, . . . , 4] to [1, . . . , 5] by adding one. The mapping or scaling is performed before the calculations, so that log(D) is never negative.

One objective of the invention is to provide overall distortion prediction when both compression artifacts and channel artifacts are present in the video sequence. The video sequence is denoted by V. In one embodiment, the values of both $D_m(V)$ and $D_h(V)$ are in the range of 1 . . . 5 according to MOS listed in Tab.1. The overall distortion of the video D(V) is then defined as a function of the evaluation score of compression artifacts and channel artifacts as $$D(V) = D_{tot}(V) = D(D_m(V), D_h(V)) \qquad (5)$$

The invention is based on the following conclusions about joint perception of compression artifacts and channel artifacts that have been observed.

First, in joint perception, compression artifacts are the fundamental factor while channel artifacts are a plus. In most cases, compression artifacts are much more uniform than channel artifacts. The compression artifacts are more evenly distributed over the video sequence while the channel artifacts may burst from a spatio-temporal point of the video sequence and disappear later abruptly. So a viewer's perception when browsing the video is frequently only dominated by the compression artifacts. The channel artifacts only occur once in a while. Therefore, it is an advantage of the invention that the compression artifacts are given higher priority for the overall perception. The present invention defines the overall perception according to this observation as:

$$D(V)=D(D_m(V), D_h(V))=D_m(V)+f_1(D_m(V), D_h(V)) \quad (6)$$

Second, the influence of channel artifacts on overall perception is much higher when the compression artifacts are on a low level. When there are very low level compression artifacts in the video sequence, viewers are more likely to be annoyed by the abruptly appearing channel artifacts: firstly, the channel artifacts are much more obvious against its high-quality surroundings because of a low compression; secondly, human psychology was trained by the higher quality frames before the channel artifacts appear, and therefore it will be easier annoyed by the abruptly appearing channel artifacts. Thus, in the proposed model, the additive effect caused by channel artifacts is proportional to the negated compression artifact. An advantage is that the model considers that, if the coding artifact is higher, the channel artifacts will have less influence for overall distortion. The higher the coding artifact level is, the less influence channel artifacts have.

Third, it has been observed that a viewer can easily identify the difference of channel artifacts when they are in a relative lower level. On the other hand, it's harder to identify the difference of channel artifacts when the channel artifacts are already in a relatively high level. Thus, in the proposed model, the plus effect caused by channel artifacts is proportional to $-\log(D_h(V))$ (assuming $D_h(V) \geq 1$). As a result and an advantage, the overall distortion increases fast when the channel artifact is low. When the channel artifacts become larger, the overall distortion increases slowly until finally approaching an upper limit.

Fourth, the influence of channel artifacts on the overall perception is individual, i.e. it may be varied for different persons. Thus, in one embodiment, an advantage of the proposed model is that a configurable constant $c_0$ is provided to control the impact of the plus effect caused by channel artifacts. For a viewer who is highly sensitive to the abrupt channel artifacts, the value of $c_0$ can be increased, and vice versa. In one embodiment, a method for calculating distortion of a video comprises a step of individually adjusting the parameter $c_0$. In one embodiment, a corresponding device provides a control input for the user to adjust the parameter $c_0$. This may be implemented via a parameter that is set or adjusted (e.g. varied around a preferred standard value, such as $0.9/\log(5)$ or similar) using any user interface, e.g. a GUI.

Fifth, the following additional logical conclusions about the overall perception apply:

$$D(d_m, d_{h1}) > D(d_m, d_{h2}) \text{ if } d_{h1} > d_{h2} \quad (7)$$

$$D(d_{m1}, d_h) > D(d_{m2}, d_h) \text{ if } d_{m1} > d_{m2} \quad (8)$$

$$D(d_m, 0\ 1\ )=d_m \quad (9)$$

$$D(5, d_h)=5 \quad (10)$$

In the above equations (7-10), the $d_m, d_{m1}, d_{m2}$ are valid compression artifact values, and the $d_h, d_{h1}, d_{h2}$ are valid channel artifact values. Eq.(10) is subject to normalization and "5" may be replaced by $D_{worst}$.

By the analysis of the above conclusions (which are based on collected subjective data), the invention uses, in one embodiment, the following model as an estimation of overall distortion that considers both compression artifacts and channel artifacts:

$$D(V)=D_{tot}(V)=D_m(V)+c_0 \times (5-D_m(V)) \times \log(D_h(V)) \quad (11)$$

In one embodiment, $c_0$ is a constant which is set to be $0.9/\log(5)=1.2867\ldots$ . For simplicity, in one embodiment it may be set to 1.28 or to a value between 1,2 and 1,3.

Figure 7:
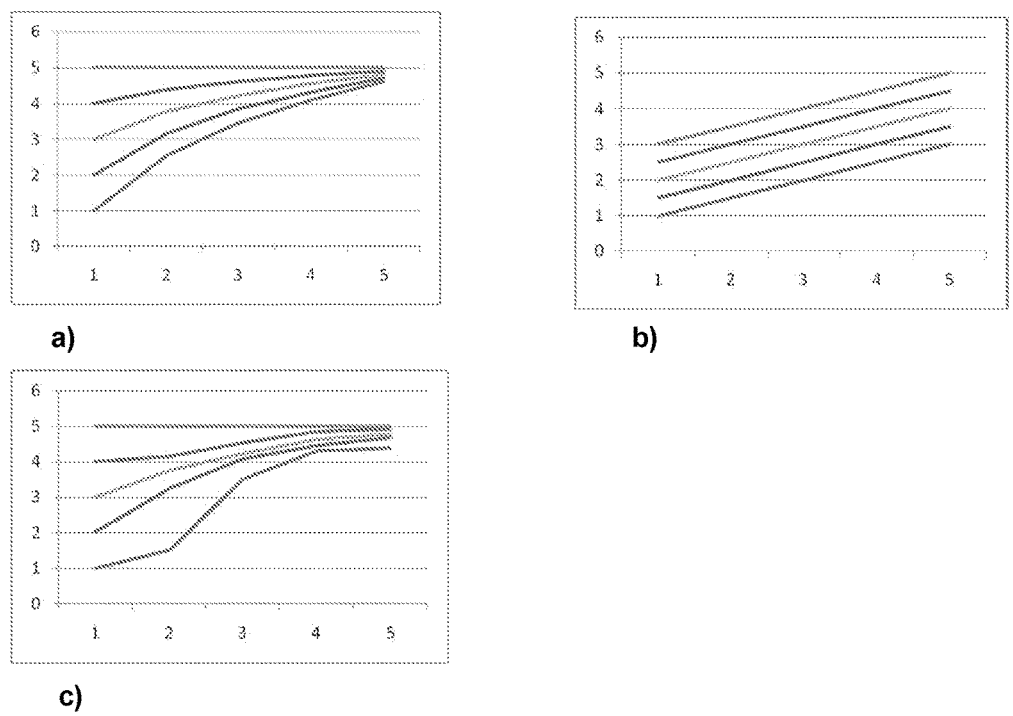
FIG. 7 the performance of the proposed model, and of known average and linear combination models.

FIG. 7 shows the performance of the proposed model, compared with known average and linear combination models. The horizontal axis represents the channel artifacts level $D_h(V)$, while the vertical axis represents the overall distortion level $D(V)$. The five curves represent $D_m(V)=5, 4, 3, 2, 1$ from top to bottom, respectively. FIG. 7a) shows the model performance of the presently proposed model, FIG. 7b) shows the model performance of a conventional averaging model and FIG. 7c) shows the subjective data composed by a sub-section of exemplarily collected data. The performance of the linear combination model is quite similar to that of the average model in FIG. 7b). As can be seen, the proposed model (in FIG. 7a) is closer to the real data (in FIG. 7c) than conventional models (in FIG. 7b).

In one aspect, the invention concerns optimization of bandwidth assignment.

There are a lot of packet loss recovery policies that can be used in video streaming, e.g. peer-to-peer video streaming. At the cost of additional bandwidth, lost data can be recovered after the loss. The following problem arises then: In a bandwidth limited system, how much bandwidth should be provided to the packet loss recovery system, and how much bandwidth should be provided to enhance the coding effect? The proposed model to estimate the overall distortion considering both coding artifacts and channel artifacts helps solving the above question.

Denote the available bandwidth by b and the bandwidth allocated to the video stream by x, then the bandwidth allocated to the packet loss recovery scheme is b−x. By applying a packet loss recovery scheme, the channel artifact is reduced to $D_h(b-x)$. The compression artifact is $D_m(x)$ when the video is compressed with bandwidth x. The problem is then posed as to minimize $D_{tot}(D_m(x), D_h(b-x))$, where $D_{tot}$ is the above-described overall distortion determined according to the invention.

FIG. 2 shows an application scenario in a bandwidth limited transmission system with bandwidth b being available for a video stream and a packet loss recovery stream. The bandwidth x assigned to the video stream leads to a compression artifact level of $D_m(x)$, and the bandwidth b−x assigned to the packet loss recovery stream leads to channel artifacts level of $D_h(b-x)$. The bandwidth x is selected such that the overall distortion according to $D(D_m(x), D_h(b-x))$ is minimized. The overall distortion is calculated according to the method for calculating overall distortion in a video being affected by compression artifacts and channel artifacts, as described above. Thus, the method can be used for assigning in the bandwidth limited transmission system a bandwidth x to the video stream, and assigning the remaining bandwidth b−x to the packet loss recovery stream (or another recovery stream for lost data), in a manner that optimizes overall distortion. E.g. in FIG. 2a), a certain bandwidth 21A is assigned the video stream and the remaining band-width 21B is assigned to the packet loss recovery stream, which results in a first compression artifact level of $D_{m1}(x)$ and a first channel artifacts level of $D_{h1}(b-x)$. In FIG. 2b), more bandwidth 22B is assigned to the recovery stream, so that less bandwidth 22A remains for the video stream. Thus, the assignment will result in a second compression artifact level of $D_{m2}(x)$ that is higher (i.e. worse) than the first (i.e., $D_{m2}(x) > D_{m1}(x)$), and a second channel artifacts level of $D_{h2}(b-x)$ that is lower (i.e. better) than the first (i.e., $D_{h2}(b-x) < D_{h1}(b-x)$). The reason is that less bandwidth for the video results in more compression artifacts, while more bandwidth is available for curing channel artifacts. Note that high artifact levels correspond to low video quality.

Similarly, in FIG. 2c) even more bandwidth 23B is assigned to the recovery stream, so that even less bandwidth 23A remains for the video stream. Thus, the assignment will result in a third compression artifact level of $D_{m3}(x)$ that is higher than the first and second (i.e., $D_{m3}(x)>D_{m2}(x)>D_{m1}(x)$), and a third channel artifacts level of $D_{h3}(b-x)$ being lower than the first ($D_{h3}(b-x)<D_{h2}(b-x)<D_{h1}(b-x)$). However, since both artifact levels need to be adjusted to optimize the overall artifacts level (i.e. overall distortion), this is an optimization problem that can be solved by minimizing the overall distortion according to the invention, as implemented e.g. in eq.(11).

Figure 6:
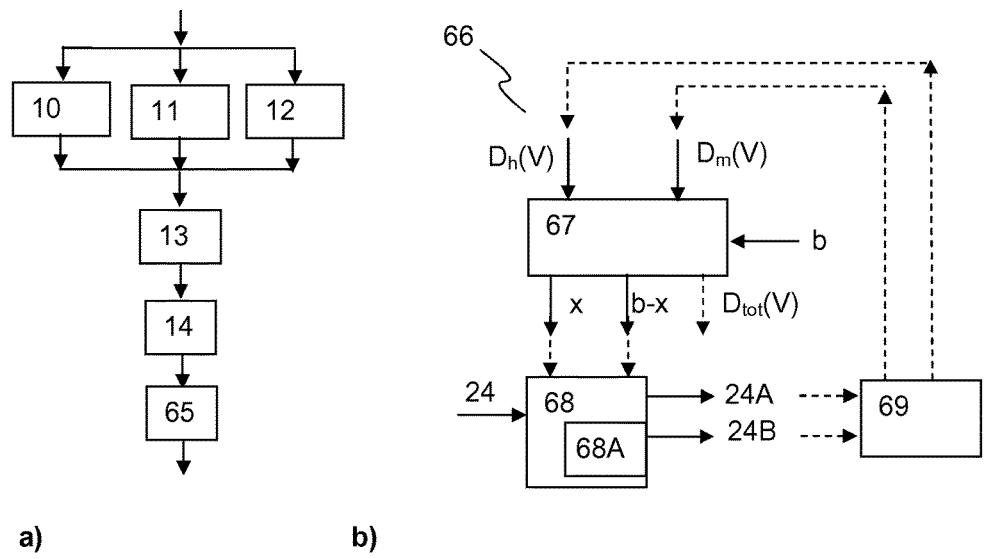
FIG. 6a) a flow-chart of a method for assigning available bandwidth to a video stream and a packet loss recovery stream in a bandwidth limited transmission system.
FIG. 6b) the structure of a device for assigning available bandwidth to a video stream and a packet loss recovery stream in a bandwidth limited transmission system.

As FIG. 6a) shows, a method for assigning, in a bandwidth limited transmission system, available bandwidth b to a video stream 21A and to a packet loss recovery stream 21B, wherein the bandwidth x assigned to the video stream leads to a compression artifact level $D_m(x)$ and the bandwidth b−x assigned to the packet loss recovery stream leads to a channel artifacts level of $D_h(b-x)$, and wherein an overall distortion $D_{tot}$ of the video is calculated as a sum 14 of the compression artifact level $D_m(x)$ and a summand S that is derived from log ($D_h(b-x)$) multiplied with a factor that decreases with increasing compression artifact level $D_m(x)$, further comprises a step of selecting 65 the bandwidth x to minimize the overall distortion according to $D_{tot}(D_m(x), D_h(b-x))$.

FIG. 6b) shows a corresponding device. It is an apparatus 66 for assigning, in a bandwidth limited transmission system, available bandwidth b to a video stream 24A and to a packet loss recovery stream 24B, wherein the bandwidth x assigned to the video stream leads to a compression artifact level $D_m(x)$ and the bandwidth b−x assigned to the packet loss recovery stream leads to a channel artifacts level of $D_h(b-x)$. An overall distortion $D_{tot}$ of the video is calculated in an apparatus as described above, e.g. with respect to eq.(3) or eq.(11), further comprising selecting means 67 for selecting the bandwidth x to minimize the overall distortion according to $D_{tot}(D_m(x), D_h(b-x))$, e.g. according to eq.(3) or eq.(11).

In one embodiment, the apparatus for assigning bandwidth 66 provides at its output a value representing at least one of the video stream bandwidth x and the recovery stream bandwidth b−x, and/or a corresponding control signal or control parameter p for controlling a bandwidth shaping device 68. It may also be a control signal for increasing or decreasing the video stream bandwidth x or the recovery stream bandwidth b−x respectively. In one embodiment, the apparatus 66 provides at an output a value of the overall distortion $D_{tot}$. In one embodiment, the apparatus 66 comprises a bandwidth shaping device 68 that is suitable for shaping an input video stream 24 to the assigned bandwidth x and providing the bandwidth-shaped video stream 24A. Further, the bandwidth shaping device 68 may comprise means 68A for generating a recovery stream 24B of the assigned bandwidth b−x. The means 68A for generating a recovery stream 24B may also be external to the bandwidth shaping device 68, but receives from the selecting means 67 or the bandwidth shaping device 68 a control signal defining the bandwidth of the recovery stream 24B.

Further down the transmission path, the compression artifact level $D_m(x)$ and the channel artifacts level $D_h(b-x)$ may be determined in a determining device 69 and fed back as input to the apparatus 66 for assigning available bandwidth. The invention can be used, inter alia, for video quality estimation and/or for video quality control based on such estimation.

It should be noted that although only particular methods of compression artifact measuring and channel artifacts measuring are described, other types of compression artifact measuring and channel artifacts measuring may be used other than the particular methods described above, as would be apparent to those of ordinary skill in the art, all of which are contemplated within the spirit and scope of the invention.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

It will be understood that the present invention has been described purely by way of example, and modifications of detail can be made without departing from the scope of the invention. Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

CITED REFERENCES

[1] "A Universal Image Quality Index", Z. Wang, and A. C. Bovik, IEEE Signal Processing Letters, vol. 9, p. 81-84, March 2002
[2] "Method and device for estimating video quality on bitstream level", N. Liao, X. Gu, Z. Chen, K. Xie, co-pending International Patent Application PCT/CN2011/000832, International Filing date May 12, 2011, Internal docket number PA110009
[3] "A Novel Video Quality metric for Low Bit-rate Video Considering both Coding and Packet-loss Artifacts", T. Liu, Y. Wang, J. Boyce, H. Yang, and Z. Wu in: Special Issue on Visual Media Quality Assessment, IEEE Journal of Selected Topics in Signal Processing, Vol. 3, No. 2, pp. 280-293, April 2009.

The invention claimed is:

1. A method comprising calculating the overall distortion D(V) of a video stream V being affected by compression artifacts represented by a compression artifact level $D_m(V)$ and channel artifacts represented by a channel artifact level $D_h(V)$, comprising:
  calculating, by at least one processor, a summand S from log ($D_h(V)$) multiplied with a compression artifact factor (K−$D_m(V)$) that decreases with increasing compression artifact level $D_m(V)$, where K is a positive constant summand;
  adding, by the at least one processor, the compression artifact level $D_m(V)$ and summand S to obtain a measure for said overall distortion D(V); and minimizing the measured overall distortion D(V) by assigning available bandwidth to the video stream based on an output of the measured overall distortion D(V) to correct the video stream affected by compression artifacts and channel artifacts.

2. The method according to claim 1, wherein the summand S is calculated according to $S=c_0(K-D_m(V))\log(D_h(V))$, with $c_0$ and K being positive constants, the channel artifacts level $D_h(V)$ being positive and $\log(D_h(V))$ being a logarithm of the channel artifacts level $D_h(V)$.

3. The method according to claim 2, wherein the compression artifact level $D_m(V)$ and the channel artifact level $D_h(V)$ are measured in a range between a minimum value and a maximum value, and K is equal to the maximum value.

4. The method according to claim 3, wherein $c_0$ is equal to $0.9/\log(K)$.

5. The method according to claim 3, further comprising: receiving control data from a user interface; and setting or adjusting the parameter $c_0$ according to the control data.

6. The method according to claim 2, wherein the minimum value is 1 and the maximum value is 5, and $c_0$ is equal to 1.2876.

7. The method according to claim 1, further comprising a mapping, wherein the compression artifact level $D_m(V)$ and the channel artifact level $D_h(V)$ are measured in a range between a minimum value and a maximum value, and wherein the minimum value is mapped to 1 and the maximum value is mapped to 5 by a linear operation in said mapping step, and wherein K is substantially equal to 5 and $c_0$ is equal to $0.9/\log(5)$ which is equivalent to 1.28.

8. The method according to claim 1, wherein the assigning further comprises assigning, in a bandwidth limited transmission system, available bandwidth b to a video stream and to a packet loss recovery stream, wherein a bandwidth x assigned to the video stream leads to a compression artifact level $D_m(x)$ and the bandwidth b−x assigned to the packet loss recovery stream leads to a channel artifacts level of $D_h(b-x)$, wherein an overall distortion $D_{tot}$ of the video is calculated according to claim 1, the method further comprising selecting the bandwidth x to minimize the overall distortion according to $D_{tot}(D_m(x), D_h(b-x))$.

9. An apparatus comprising calculating overall distortion in a video stream-V being affected by both compression artifacts represented by a compression artifact $D_m(V)$ and channel artifacts represented by a channel artifact level $D_h(V)$, comprising:
a calculator for calculating, by at least one processor, a summand S from log ($D_h(V)$) multiplied with a compression artifact factor ($K-D_m(V)$) that decreases with increasing compression artifact level $D_m(V)$, where K is a positive constant summand;
an adder for adding the compression artifact level $D_m(V)$ and the summand S to obtain a measure for said overall distortion D(V); and
a controller for minimizing the overall distortion by assigning available bandwidth to the video stream based on an output of the overall distortion to correct the video stream affected by compression artifacts and channel artifacts.

10. The apparatus according to claim 9, wherein the compression artifact level $D_m(V)$ and the channel artifact level $D_h(V)$ are measured in a range between a minimum value and a maximum value and K is substantially equal to the maximum value.

11. The apparatus according to claim 10, wherein the minimum value is 1 and the maximum value is 5, and $c_0$ is equal to 1.2876.

12. The apparatus according to claim 9, further comprising input unit for receiving control data from a user interface, and a controller-for setting or adjusting at least one of the parameters K, $c_0$ according to the control data.

13. The apparatus according to claim 9, wherein the summand S is calculated according to $S=c_0(K-D_m(V))\log(D_h(V))$, with $c_0$ and K being positive constants, the channel artifacts level being positive and $\log(D_h(V))$ being a logarithm of the channel artifacts level.

14. The apparatus according to claim 9, wherein the assigning further comprises assigning, in a bandwidth limited transmission system, available bandwidth b to a video stream and to a packet loss recovery stream, wherein a bandwidth x assigned to the video stream leads to a compression artifact level $D_m(x)$ and a bandwidth b−x assigned to the packet loss recovery stream leads to a channel artifacts level of $D_h(b-x)$, the overall distortion $D_{tot}$ of the video being calculated in an apparatus according to claim 10, the apparatus for assigning available bandwidth comprising a selector for selecting the bandwidth x to minimize the overall distortion according to $D_{tot}(D_m(X), D_h(b-x))$.

15. A method for controlling a video quality by calculating the overall distortion D(V) of a video stream V being affected by compression artifacts represented by a compression artifact level $D_m(V)$ and channel artifacts represented by a channel artifact level $D_h(V)$, comprising:
calculating, by at least one processor, a summand S from log ($D_h(V)$) multiplied with a compression artifact factor ($K-D_m(V)$) that decreases with increasing compression artifact level $D_m$, where K is a positive constant summand;
adding, by the at least one processor, the compression artifact level $D_m(V)$ and summand S to obtain a measure for said overall distortion D(V); and
controlling the video quality of the video stream V based on an output of the measured overall distortion D(V) to correct the video stream affected by compression artifacts and channel artifacts.

16. An apparatus for controlling a video quality by calculating overall distortion in a video stream-V being affected by both compression artifacts represented by a compression artifact $D_m(V)$ and channel artifacts represented by a channel artifact level $D_n(V)$, comprising:
a calculator for calculating, by at least one processor, a summand S from log ($D_h(V)$) multiplied with a compression artifact factor ($K-D_m(V)$) that decreases with increasing compression artifact level $D_m(V)$, where K is a positive constant summand;
an adder for adding the compression artifact level $D_m(V)$ and the summand S to obtain a measure for said overall distortion D(V); and
a controller for controlling the video quality of the video stream V based on an output of the overall distortion to correct the video stream affected by compression artifacts and channel artifacts.

17. A non-transitory computer-readable storage medium comprising a computer-readable program for controlling a video quality by calculating the overall distortion D(V) of a video stream V being affected by compression artifacts represented by a compression artifact level $D_m(V)$ and channel artifacts represented by a channel artifact level $D_h(V)$, wherein the computer-readable program when executed on a computer causes the computer to perform the steps of:

calculating, by at least one processor, a summand S from log $(D_h(V))$ multiplied with a compression artifact factor $(K-D_m(V))$ that decreases with increasing compression artifact level $D_m$, where K is a positive constant summand;

adding, by the at least one processor, the compression artifact level $D_m(V)$ and summand S to obtain a measure for said overall distortion $D(V)$; and controlling the video quality of the video stream V based on an output of the measured overall distortion $D(V)$ to correct the video stream affected by compression artifacts and channel artifacts.

* * * * *